UNITED STATES PATENT OFFICE.

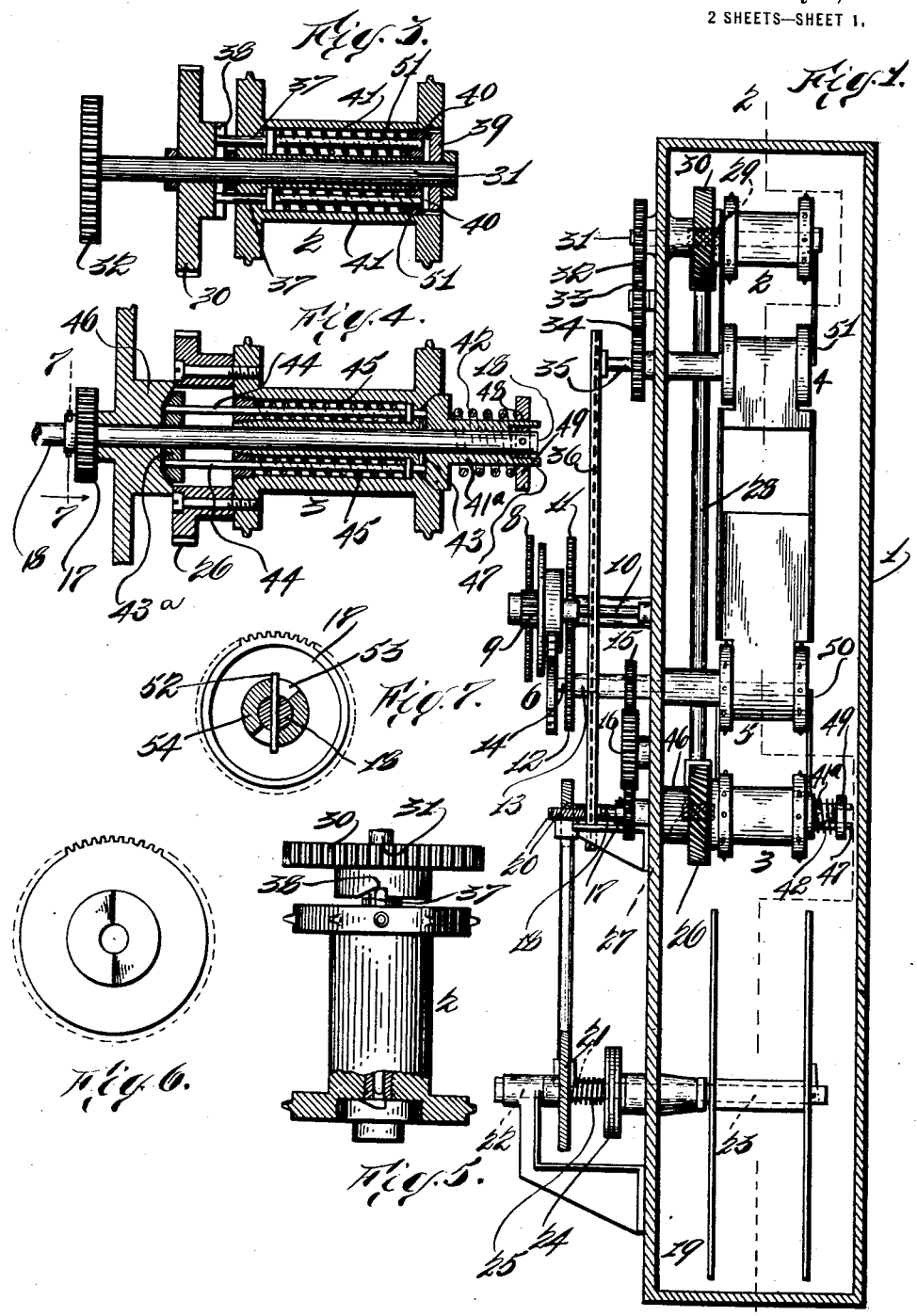

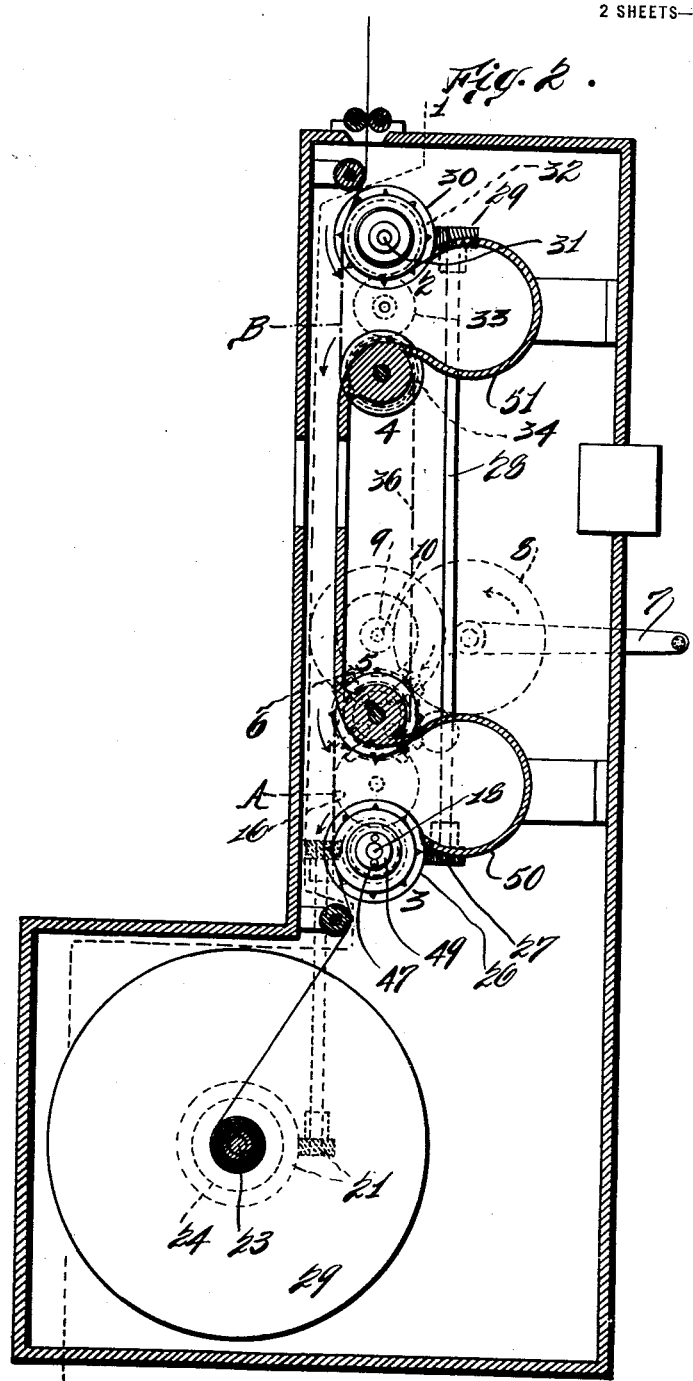

MICHAEL SEGEL, OF NEW YORK, N. Y., ASSIGNOR TO ELIZABETH MEHLFELDER UEBELMESSER, OF BAYSIDE, NEW YORK.

COMPENSATING FEED FOR MOVING-PICTURE MACHINES.

1,271,623.  Specification of Letters Patent.  Patented July 9, 1918.

Application filed February 18, 1914. Serial No. 819,392.

*To all whom it may concern:*

Be it known that I, MICHAEL SEGEL, a citizen of the United States, residing at New York city, in the county and State of New York, have invented certain new and useful Improvements in Compensating Feeds for Moving-Picture Machines, of which the following is a clear, full, and exact description.

This invention relates to a device for motion picture machines adapted to automatically tend to keep the upper and lower loops of the film uniform and to automatically form a loop should the film, for any reason, become taut between the upper and lower sprockets and the sprockets adjacent thereto.

In the drawings:

Figure 1 is a sectional part elevation of a motion picture device embodying my improvement, the section being taken on a line 1—1 in Fig. 2.

Fig. 2 is a sectional side elevation, the section being taken on a line 2—2 in Fig. 1.

Figs. 3 and 4 are enlarged longitudinal sectional views of the upper and lower sprockets respectively.

Fig. 5 is a top plan view of the upper sprocket.

Fig. 6 is an enlarged detail side elevation, looking from the right in Fig. 3, of the upper reel operating gear.

Fig. 7 is an enlarged detail sectional side elevation of the lower reel operating gear.

The accompanying drawings illustrate my improved device as applied to a motion picture machine; the arrangement of the parts of the machine, as herein illustrated, is arbitrary, the object being merely to illustrate the essentials of the motion picture machine in connection with my improvement.

As herein illustrated, 1 indicates the casing of a motion picture provided with an upper sprocket 2, lower sprocket 3, idler sprocket 4 and the film advancing sprocket 5, which advances the film step by step. The sprocket 5 is operated by any suitable device arranged to rotate it step by step as, for instance, the well known Geneva movement 6, which I will not describe in detail. The operating handle 7 operates a gear 8, which in turn rotates the Geneva movement 6 by means of a gear 9 on the shaft 10 of the said Geneva movement; the handle 7 also operates a gear 11, Fig. 1, which meshes with a gear 12 carried by a sleeve 13 rotatably mounted on the shaft 14 of the sprocket 5. The sleeve 13 carries a gear 15 meshing with an idler 16, which in turn meshes with the gear 17 on the shaft 18 of the lower sprocket 3. Through this train of gearing the lower sprocket 3 is driven. The lower or take-up reel 19 is driven by means of gearing 20, one member of which is carried by the shaft 18, and gearing 21, one member of which is mounted on the shaft 22. The shaft 22 is frictionally connected to the reel operating shaft 23 by friction disks 24 held in contact by a spring 25.

The upper sprocket 2 is driven by the movement of the lower sprocket 3. The lower sprocket carries a gear 26, which operates a gear 27 carried by the vertical shaft 28 supporting at its upper end a gear 29 meshing with a gear 30 loosely mounted on the shaft 31 of the upper reel 2. The connection between the gear 30 and upper sprocket 2 is releasable for a purpose to be hereinafter described. The shaft 31 of the upper sprocket 2 also carries a gear 32, meshing with an idler 33, which in turn operates the idler roll 4, by means of a gear 34 on the shaft 35 of the idler roll. The idler roll 4, gears 32, 33, 34 and shaft 31 are operated by means of a sprocket chain 36 driven from the shaft 18.

As will be evident the shaft 31 will be driven at the same speed as the sprocket 4, which is the regular speed of the drive, and as long as the film is moving properly all of the sprockets 2, 3 and 4 will move at the same rate of speed, it being borne in mind that the sprocket 2 is driven from the sprocket 3, and not directly from the regular drive, or drive common to the other sprockets. The sprockets 2 and 3 will, at all times, that is to say, as long as the film is operating normally, travel in unison, but should the lower loop become taut, both sprockets will stop. Should the upper loop become taut the upper sprocket 2 will be caused to connect with the regular drive, which it is normally disconnected from. The object of connecting the upper sprocket with the regular drive should the upper loop become taut, is to again form the upper loop.

Should the lower loop become taut it will, after the lower sprocket stops, be again formed, during the period of rest of the lower sprocket, by the operation of the intermittently operated sprocket 5.

Referring particularly to the sprockets 2 and 3 it will be seen by referring to Figs. 3 and 4 that they are of a special construction, which I will now describe. Both the sprocket 2 and sprocket 3 are releasably connected to the elements which drive them. In other words the sprocket 2 is driven by the loosely mounted gear 30, which is, as has been stated, driven by the lower sprocket 3, through the medium of retractable pins 37 co-acting with cam slots 38 in the gear 30. The pins 37 are also adapted to engage a cam plate 39 secured to the shaft 31, should the sprocket 2 stop by reason of a taut film. When the pins 37 engage the cam-slots 40 in the plate 39 the sprocket 2 will be connected to the regular drive. The pins 37 are held in mesh with the slots 38 in the gear 30, or caused to mesh therewith, by springs 41. The lower sprocket 3 is frictionally driven, and is releasably connected to the shaft 18. To drive the lower sprocket I have herein illustrated a sleeve 41ª slidable on the shaft 18, the said sleeve being forced in contact with the sprocket 2 by a spring 42. The sleeve 41ª is provided with cam slots 43 similar to the cam slot 38 in the gear 30. The sprocket 3 is provided with a brake mechanism, adapted to absolutely stop the rotation of the sprocket should the lower film become taut.

To arrest the movement of the sprocket 3 I employ a slidable brake shoe 43 carried by pins 44 in the sprocket 3 as shown, springs 45 being employed to keep the brake shoe 43 normally out of contact with the stop 46, which is fixed. The sleeve 41ª is provided with fingers 47, which passes through openings 48 in a collar 49 secured to the shaft 18. By this means the sleeve 41ª will rotate and yet slide upon the shaft 18 when it is forced out of contact with the sprocket 3.

During the operation of the machine should the lower loop become taut, as shown by dotted lines A in Fig. 2, the lower sprocket 3 would stop due to the pull of the straightened loop. When the lower sprocket stops the upper sprocket also stops. As soon as the lower sprocket stops, the cams 43 on the sleeve 41ª would force the pins 44 toward the left, causing the brake shoe 43 to contact with the stop 46. As I preferably employ a plurality of the cams, in this instance 2, as shown in Fig. 6, the shoe 43ª will remain in contact with the stop 46 until the depressions again aline with the pins 44, at which time the shoe will leave the stop 46. During the time that the shoe and stop are in contact the sleeve 41ª will be held out of contact with the sprocket 3, hence the sprocket will remain at rest.

When the cam depressions aline with the pins the springs 45 will force the said pins into said depressions and the shoe 43 and stop 46 will break contact. When this action has taken place the sprocket 3 will again rotate.

During the period of rest of the sprocket 3 the action of the sprocket 5 will form a new loop in the box 50, the film to form the lower loop being taken from the upper loop in the box 51. As the roller 4 is smooth the film will slip over the surface thereof.

When the upper sprocket comes to rest, being caused to do so by the cessation of the movement on the part of the lower sprocket, or rather when the upper gear 30 comes to rest, the cams 38 will force the pins 37 in the upper sprocket toward the right (see Fig. 3) causing them to engage the cams 40 on the plate 39. As soon as the said pins engage the cams 40 the sprocket 2 will be connected with the regular drive, hence it will be given a thrust forward, increasing the loop in the box 51, which is taken up by the sprocket 5, and formed in the box 50. As soon as the pins 37 aline with the depressions adjacent the cams 38 the springs 51 will force the pins into the said depressions, which will cause them to leave the plate 39 after which the sprocket 2 will be connected with the gear 30. As all of the sprockets will travel at the same rate of speed the sprockets 2 and 3 will be thrown out or in with respect to their operating devices simultaneously.

Should the upper loop become taut, as shown by dot and dash lines B (Fig. 2) the upper sprocket 2 only will stop, and when it does stop it will be caused to connect with the regular drive, which will, as has been described, form a new loop in the box 51.

A further feature of the devices consists of means to move the film out of contact with the wall of the boxes 50 and 51 when the machine is put in operation. By referring to Fig. 7, which is a section of the shaft 18 and gear 17 for the sprocket 2, it will be seen that the said shaft carries a pin 52 which passes through jaws or slots 53 in the hub 54 of the gear 17. It will be evident that the shaft 18 is not immovably secured to the gear 17, but is adapted for a certain amount of play in the direction of rotation. It is the provision of such play that permits the loop to be carried away from the wall of the boxes 50 and 51.

When the film is threaded into the machine, and when the sprockets are given their initial movement, the lower take-up reel 19 will be driven slightly faster than the other rotary element; this action pulls the film in the box 50 ahead, causing it to leave the wall thereof. As soon as the film is pulled the sprocket 3 will be advanced to the extent of the movement of the pin 52 in the jaws 53; in other words, the sprocket 3 will be advanced in the direction of its rotation, to the extent of the jaws 53.

I claim as my invention:

1. In a moving picture machine or the like, an upper continuously driven feed roller provided with a normal and an abnormal speed driving mechanism therefor, a lower continuous feed sprocket controlling at least one of the speeds of said upper feed roller.

2. In a moving picture machine having a lower and an upper continuously rotating feed sprocket, said lower sprocket being provided with speed arresting means, in combination with means to arrest the motion of the upper feed sprocket when the lower feed sprocket is retarded, consisting of common driving connections between the two sprockets.

3. In a moving picture machine or the like, an upper feed sprocket driven by the lower feed sprocket, said lower feed sprocket having mounted in its body a device consisting of plungers and tension springs and controlled by the film to engage or disengage said lower feed sprocket with the general mechanism of the moving picture machine.

4. In a motion picture machine, a plurality of film advancing sprockets, a main drive therefor, an intermittently operated sprocket operated by said main drive, one of said film advancing sprockets being normally connected to said main drive by means of a clutch and adapted for disconnection therefrom, another of said sprockets being connected to and operated by the sprocket first named by driving connections therewith, but adapted for disconnection from said first named sprocket and connection to the main drive automatically by clutch and ratchet interposed in the driving means between said sprockets.

5. In a moving picture machine, an upper continuous feed sprocket for a film, a loop in said film after said sprocket, an intermittent sprocket, a loop in said film between said intermittent sprocket and a lower feed sprocket, means to arrest the motion of said lower feed sprocket, in combination with a device consisting of driving connections and clutch member for the upper feed sprocket controlled by the lower feed sprocket for the purpose of compensating one loop at the expense of the other loop, as described.

6. In a motion picture device, an upper continuously driven sprocket, an intermittently driven sprocket, a lower continuously driven sprocket, a film passing over said sprockets forming a loop before reaching the intermittent sprocket, and a loop after reaching the intermittent sprocket, a device consisting of a driving connection controlled by one of said sprockets to vary the speed of the upper sprocket and arrest the speed of the lower continuously driven sprocket simultaneously as soon as the film becomes tight in the loop between the intermittently driven sprocket and the lower continuously driven sprocket automatically and substantially as described.

7. In a moving picture machine or the like, an upper feed sprocket driven normally by a lower feed sprocket, an additional higher speed driving means for said upper feed sprocket to engage said sprocket and advance the speed thereof when the film on said sprocket exerts a forward pull on said sprocket.

8. In a motion picture machine an upper feed sprocket adapted to be supplied with a plurality of speeds by a selective driving mechanism which is controlled by the combination of the film thereon automatically consisting of a film feed sprocket, a support therefor, a plurality of rotary driven members, said members revolving at different speeds and a clutch member controlled by the film on the sprocket to engage the rotary members alternately.

9. In a motion picture machine an upper feed sprocket and a lower feed sprocket, means for maintaining a predetermined slack in the film comprising a selective gear drive mechanism, means for controlling said gear drive mechanism by the film.

10. In a motion picture machine an intermittently driven sprocket and a continuously driven sprocket, means for accommodating a loop of film between said sprockets, a continuously driving member for said sprocket and a brake for said driving member.

11. In a moving picture machine or the like, a continuously driven film sprocket mounted on a shaft loosely, a driving gear mounted on said shaft in such manner as to allow the sprocket a predetermined amount of radial freedom before being positively engaged by the driving force of said shaft, for the purpose of reducing the loop controlled by said feed sprocket, a cam on the drive gear, a brake on the sprocket, a shiftably mounted bar in the sprocket adapted to engage the cam on the drive gear and the brake alternately.

Signed at New York city, in the county and State of New York, this 2nd day of February, one thousand nine hundred fourteen.

MICHAEL SEGEL.

Witnesses:
  MABEL DITTENHOEFER,
  H. MONTGOMERY.